Jan. 11, 1966   W. L. RUBIN   3,229,284
PULSED RADAR TARGET RANGE AND VELOCITY MEASURING SYSTEM
Filed April 6, 1959   2 Sheets-Sheet 1

INVENTOR
WILLIAM L. RUBIN
BY
ATTORNEY

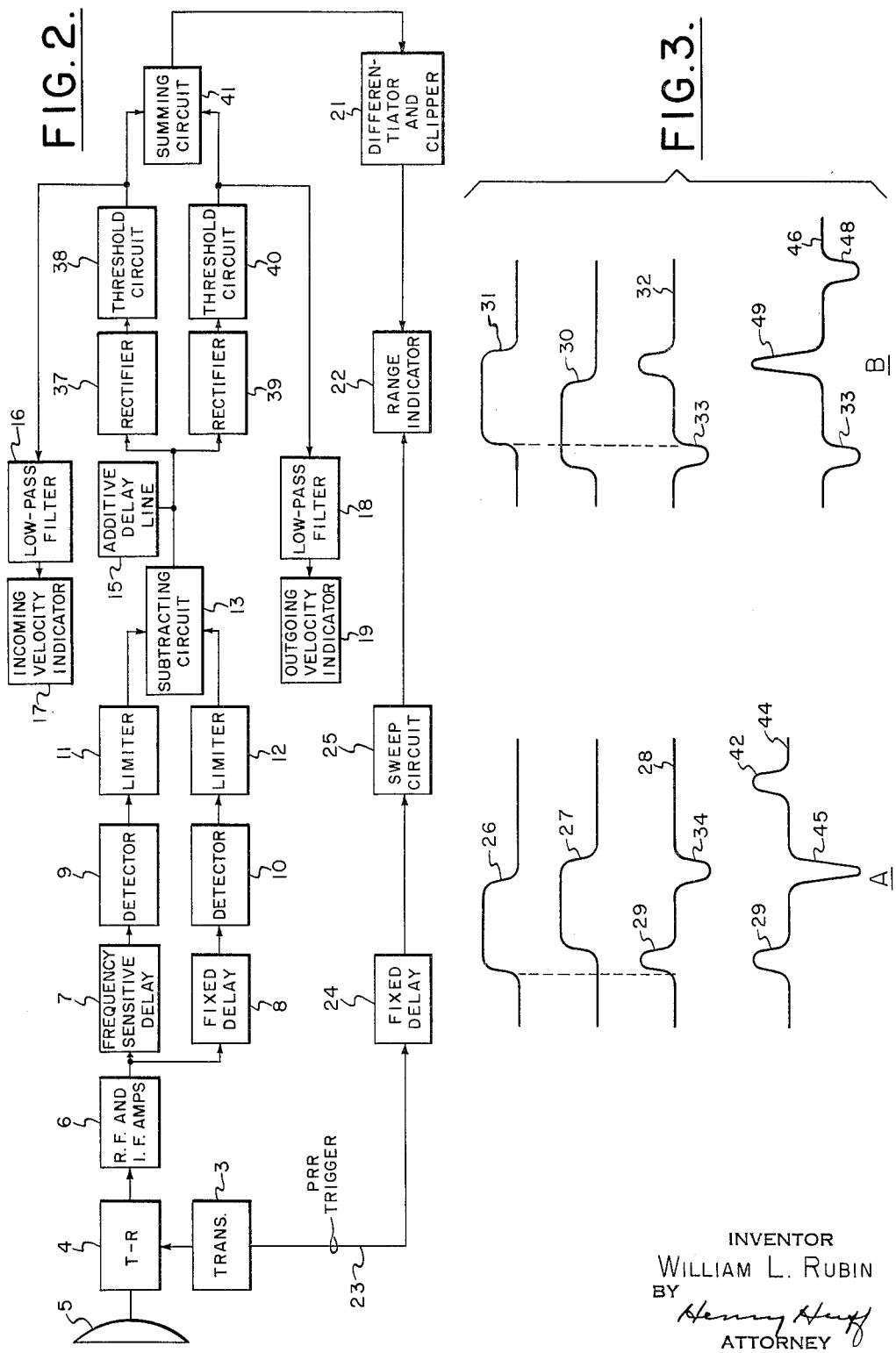

United States Patent Office 3,229,284
Patented Jan. 11, 1966

3,229,284
PULSED RADAR TARGET RANGE AND
VELOCITY MEASURING SYSTEM
William L. Rubin, Whitestone, N.Y., assignor to Sperry
Rand Corporation, a corporation of Delaware
Filed Apr. 6, 1959, Ser. No. 804,542
6 Claims. (Cl. 343—9)

The present invention relates to target range and velocity measuring radars and, more particularly, to a pulsed radar system adapted for the determination of target range and velocity within a single pulse repetition interval.

Pulsed radars are well known in the art for the measurement of target range and target velocity. Target range, of course, has been ascertained within a single pulse repetition interval of the radar. In the case of target velocity determination, however, prior pulsed radar systems have contemplated the use of target echo signals received during a large number of pulse repetition intervals. Although target velocity information is incipient in each individual Doppler-shifted target echo signal, it has been feasible to extract velocity data only on the basis of a relatively long time integration of the successive echo signals.

For example, some prior art systems are responsive to the fluctuations in target video pulse amplitude attributable to target velocity. The varying amplitude video pulses of the moving target are applied to a plurality of fixed tuned band pass filters designed to pass the relatively low fluctuation frequencies. The velocity of the moving target is determined by noting the particular band pass filter which passes the video pulse fluctuation frequency. One disadvantage of this technique is that a relatively large number of individual target video pulses are required to excite the band pass filters at the fluctuation frequencies.

It is the general object of the present invention to provide a pulsed radar system adapted for the simultaneous determination of target range and velocity during a single pulse repetition interval.

Another object is to produce a data signal having mutually exclusive characteristics representing, respectively, radar target range and radar target velocity.

A further object is to provide means in a pulsed radar system for the generation of a target data pulse, the pulse occurring at a time proportional to target range and having a duration proportional to the target velocity.

An additional object is to provide means in a pulsed radar system for automatically cancelling stationary target echo signals during a single pulse repetition interval.

These and other objects of the present invention, as will appear upon a reading of the following specification, are achieved in a preferred embodiment by the provision of a radar adapted for the transmission of a linearly frequency modulated pulsed carrier signal. The receiver portion of the radar includes a pair of target echo pulse processing channels. One of the receiver channels is provided with a frequency sensitive pulse delay element which introduces a variable time delay in each of the received echo signals as a function of the frequency content of the echo signals. The other receiver channel incorporates a frequency insensitive pulse delay means for imparting a predetermined time delay in each received target echo pulse irrespective of its frequency content.

The pulses appearing at the output of the first and second receiver channels are then compared in amplitude to produce an output data pulse whose occurrence, relative to that of the radar system trigger, is indicative of target range and whose duration is proportional to target velocity. Means are provided for responding to said data pulse to produce unambiguous indications of the magnitude and sense of the target velocity as well as target range.

For a more complete understanding of the present invention, reference should be had to the following specification and to the appended drawings, of which:

FIG. 2 is a block diagram of a preferred embodiment of the invention; and

FIG. 3 is a series of wave forms useful in explaining the operation of the apparatus of FIG. 2.

Figure 1:
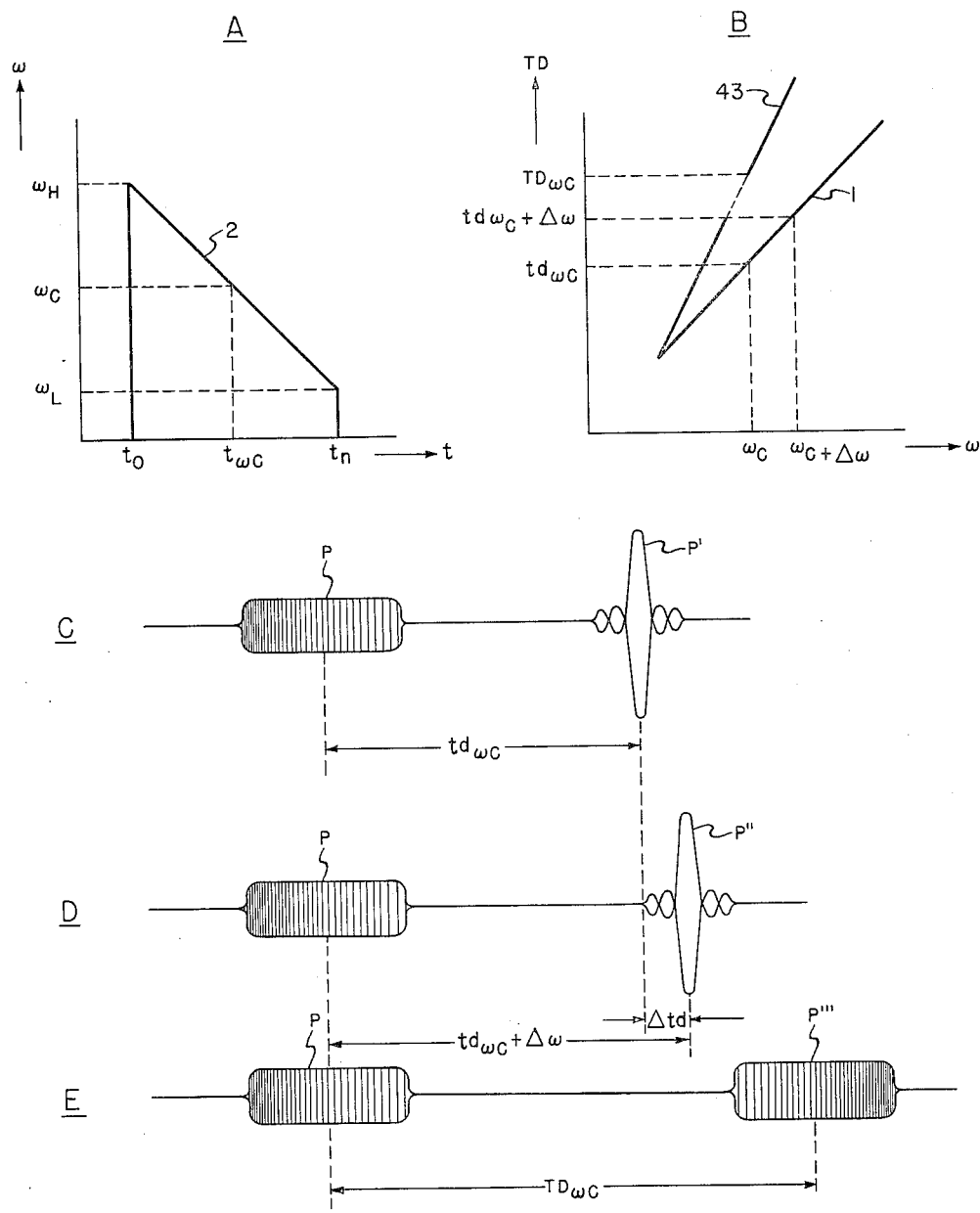
FIG. 1 is a series of diagrams illustrative of the principles of operation of the present invention.

The radar system of the preferred embodiment of the present invention includes means for the transmission of a frequency modulated pulsed carrier signal. The frequency modulation preferably is a linear function with respect to time as indicated in the diagram of FIG. 1A which is a plot of carrier frequency versus time of the transmitted pulse. It will be seen that the frequency of said carrier is linearly varied in a decreasing sense from a high frequency value $\omega_H$ occurring at time $t_0$ to a lower terminal value $\omega_L$ occurring at time $t_n$. The center frequency of the frequency modulated transmitted pulse is designated $\omega_c$. The transmitted pulse occurs during the time interval intervening $t_0$ and $t_n$.

It has been shown in the prior art that if a frequency sensitive receiver delay element having the characteristics represented by line 1 of FIG. 1B, is utilized to cooperate with the frequency modulated pulsed carrier of FIG. 1A, the transmitted pulse may be modified or compressed into one of shorter duration but higher amplitude. Such a result is represented in FIG. 1C wherein the transmitted pulse P is delayed and compressed into the pulse P'. For example, the center frequency $\omega_c$ of the transmitted pulse is delayed an amount $td_{\omega c}$ in the receiver pulse compressor filter. With reference to FIGS. 1B and 1D, it should also be noted that if the carrier frequency of the transmitted pulse were shifted by an amount $\Delta\omega$, the average time delay introduced into the received echo pulse would be $td_{\omega c+\Delta\omega}$.

As is well understood in the art, target echo signals reflected from an incoming target are shifted in frequency to a value higher than that of the transmitted pulse. That is the well known Doppler effect. Conversely, the frequencies of echo signals from an outgoing target are reduced relative to those of the transmitted pulse. Accordingly, the carrier frequency of the reflected pulse will experience a frequency shift in the presence of the moving target. Assuming, for example, that the target is approaching the radar, i.e., an incoming target, the transmitted carrier $\omega_c$ will be shifted upwardly to the frequency $\omega_c + \Delta^\omega$, thus increasing the average time delay $td_{\omega c}$ of the received signals by an amount $\Delta td$. The additional time delay $\Delta td$ is shown in FIG. 1D. The present invention is based in part upon the recognition that the additional delay $\Delta td$, being proportional to the Doppler-induced frequency shift of the echo pulses, is directly proportional to target velocity.

It should be observed that, although the target velocity data is present in the delayed pulse P″ of FIG. 1D at the output of the receiver compressor filter, range information is not readily available. That is, the time of occurrence of the compressed pulse P″ is not only proportional to target range in a conventional manner but is also a function of target velocity. Therefore, in order to derive range data, it would be necessary to correct the apparent range (represented by the time of occurrence of compressed pulse P″ relative to the radar system trigger) by an amount computed from the target velocity. The present invention obviates such computation by the provision of dual receiving channels, only one of which includes a frequency sensitive pulse delay element similar to that characterized by line 1 of FIG. 1B.

Referring to FIG. 2, a source of preferably linearly frequency modulated pulsed carrier signals is generally represented by transmitter 3. The pulses generated by transmitter 3 are applied by T–R4 to antenna 5 for the irradiation of target objects. Reflected target echo signals are received by antenna 5 and applied by T–R4 to RF and IF amplifiers 6. The intermediate frequency pulses at the output of amplifiers 6 are applied to frequency sensitive delay 7 and frequency insensitive or fixed delay 8.

Assuming that the frequency modulation of the transmitted pulses is as represented in FIG. 1A, frequency sensitive delay 7 has a time delay versus frequency characteristic similar to but not identical to that represented by line 1 of FIG. 1B. The delay characteristic represented by line 1 of FIG. 1B is that which is required for optimum compression of the received target echo signal which contains carrier signal components frequency modulated in the same sense as that of the transmitted pulses as shown in FIG. 1A. Optimum compression is defined as that degree of received echo signal pulse distortion which results in a maximum amplitude and minipulse width. The result of optimum compression is depicted in FIGS. 1C and 1D wherein the amplitude of the compressed pulse P′ is maximized and the duration of compressed pulse P′ is minimized relative to the corresponding characteristics of the target echo signal represented by pulse P.

The design of a filter network or frequency sensitive delay line having the optimum pulse compression characteristic of line 1 of FIG. 1B is described in the Patent 2,624,876 issued on January 6, 1953, to R. H. Dicke. Briefly, the delay line consists of a plurality of identical filter sections which cooperate in the aggregate to produce the optically compressed pulse P′ of FIG. 1C in response to the linearly frequency modulated pulse signal P. It has been observed that when additional identical filter components are connected in cascade with those required for optimum pulse compression, the resultant output pulse is of an amplitude less than and of a duration greater than those of the optimally compressed pulse. When approximately twice the number of identical filter components are connected in cascade than are required for optimum compression, the resultant output pulse is substantially of the same amplitude and duration as those of the input pulse. This is shown in FIG. 1E wherein pulse P is applied to a doubly extended delay network and pulse P′′′ is the pulse produced at the output of the extended network.

It will be noted that the average delay of pulse P′′′ at the output of the extended filter network is greater than the average delay of optimally compressed pulse P′. This may be readily understood by reference to line 43 of FIG. 1B which represents the time delay versus frequency characteristic of the doubly extended filter network. For example, the average time delay $(td_{\omega c})$ introduced into the received target echo signal by an optimum pulse compression filter is increased to the amount $TD_{\omega c}$ as a result of the increased slope of characteristic 43 of the extended filter network. Characteristic 43 produces "overcompression" while characteristic 1 produces optimum compression when operating on respectively applied target echo signals. The significance of utilizing an overcompression filter network producing the results represented in FIG. 1E will become apparent in conection with the ensuing description of FIG. 2.

Referring to FIG. 2, fixed delay 8 introduces a predetermined amount of time delay in the target echo signal pulses at the output of amplifiers 6 irrespective of the frequency content of the pulses. The magnitude of the delay is made equal to the average delay $TD_{\omega c}$ of FIG. 1E which is produced in frequency sensitive delay 7 at the carrier frequency $\omega c$. The output pulses of delays 7 and 8 are detected and amplitude limited to a predetermined equal value, respectively, in detectors 9 and 10 and limiters 11 and 12. Limiters 11 and 12 may be omitted if means are provided to maintain substantially identical gain in each of the two delay channels comprising delay 7 and detector 9 on the one hand and delay 8 and detector 10 on the other. The equal amplitude video output pulses from limiters 11 and 12 are subtractively combined in subtracting circuit 13 and then applied to additive delay line 15.

Circuit 15 may comprise a conventional pulse delay line having a shortened termination and a length substantially equal to that of the equal length pulses P and P′′′ of FIG. 1E. The output of delay line 15 is simultaneously applied to rectifiers 37 and 39, each of which is adapted to pass pulses of a polarity opposite to that passed by the other. Rectifiers 37 and 39 are the input circuits to respectively associated incoming and outgoing velocity indication channels. The incoming velocity indication channel additionally comprises threshold circuit 38, low pass filter 16 and indicator 17; the outgoing velocity indication channel further includes threshold circuit 40, low pass filter 18 and indicator 19.

The additional circuits represented in FIG. 2 are operative to produce an indication of target range. For this purpose, the outputs of threshold circuits 38 and 40 are additively combined in summing circuit 41 and then applied via differentiator and clipper 21 to conventional range indicator 22. Indicator 22 may be, for example, a type A cathode ray target indicator in which case the output of differentiator and clipper 21 would be applied to the vertical deflecting plates thereof. Transmitter 3 produces an auxiliary output signal on line 23 at the radar pulse repetition rate. This signal is passed through fixed delay 24 and then applied to actuate sweep circuit 25. In the assumed case of the type A display of indicator 22, sweep circuits 25 would energize the horizontal sweep deflecting plates.

In operation, the intermediate frequency target echo pulses at the output of amplifiers 6 are time-shifted in delay 7 by an amount proportional to the frequency of the pulses. Should the pulses be those reflected from a stationary target, i.e., one which is not moving radially with respect to the radar antenna 5, a predetermined amount of time delay $TD_{\omega c}$ will be introduced. Inasmuch as the same time delay is produced in fixed delay 8, the pulses at the outputs of delays 7 and 8 will be time-coincident. Thus, the detected and amplitude equalized video pulses at the inputs to subtracting circuit 13 will also be concurrent. In this case, no output signal will be produced by circuit 13. It should be noted that cancellation of stationary target return thus is achieved within a single pulse repetition interval.

On the other hand, should the pulses at the output of amplifiers 6 be those reflected from a moving target, a delay will be produced in delay element 7 which is other than the fixed delay of element 8. As previously described for the case of an incoming target in connection with FIG. 1B, an increased time delay will be introduced in the pulse traversing frequency sensitive delay 7. Consequently, the pulse appearing at the output of delay 7 is delayed relative to the occurrence of the pulse at the output of delay 8 by an amount proportional to target velocity. This is shown in the wave forms of FIG. 3. FIG. 3A depicts the case of an incoming target which produces pulse 26 at the output of limiter 12, pulse 27 at the output of limiter 11 and pulse train 28 at the output of subtracting circuit 13. It should be observed that the leading edge of pulse 26 at the output of fixed delay 8 occurs at a time relative to the radar system trigger which is solely a function of target range. Therefore, the leading edge of pulse 29 of train 28 is also indicative of target range, said leading edge being coincident with the leading edge of pulse 26. Additionally, the duration of pulse 29, being determined by the time separation between pulses 26 and 27, is proportional to target velocity.

The wave forms of FIG. 3B illustrated the corresponding operation of the apparatus of FIG. 2 in the presence of an outgoing target. The consequence of the opposite velocity sense of the outgoing target is that the Doppler-induced frequency shift of the echo pulses is toward a lower value. The lower-valued echo signal frequency, when operated on by the characteristic 43 of FIG. 1B, results in a pulse 30 at the output of delay 7 which is delayed less than pulse 31 at the output of delay 8. In other words, pulse 30 precedes pulse 31 at the output of its respective delay circuit. Subtracting circuit 13 operates in substantially the same manner as before, resulting in the production of pulse train 32. Unlike the instance of pulse 29 of FIG. 3A, it is the trailing edge of corresponding pulse 33 which is time-coincident with the leading edge of the pulse 31 at the output of fixed delay 8. Consequently, the range of the radar target is represented by the trailing edge of pulse 33 as opposed to the leading edge of pulse 29, the latter representing the incoming target. As before, however, the duration of pulse 33 is a measure of target velocity.

The apparatus of FIG. 2 is adapted for the unambiguous display of target range and velocity in both the cases of incoming and outgoing target motion. Assuming, for example, that echo signals are being received from an incoming target, pulse train 28 will be produced at the output of subtracting circuit 13. Additive delay line 15 produces pulse train 44 in response to pulse train 28. As previously mentioned, delay line 15 is terminated by a short and is of an electrical length corresponding to the equal durations of pulses 26 and 27 of FIG. 3A at the input to subtracting circuit 13. The time separation between the leading edges (or trailing edges) of pulses 29 and 34 is always equal to the duration of pulses 26 and 27 irrespective of the time separation between pulses 26 and 27.

The first pulse 29 of train 28 appears in the output wave train 44. Pulse 29 also propagates through the delay line, is inverted in polarity upon reflection by the shorted termination and appears at the common input-output terminal of delay line 15 concurrently with negative pulse 34 of train 28. The reflected and inverted pulse 29 additively combines with negative pulse 34 to produce pulse 45 having an amplitude substantially twice that of pulse 29. Pulse 34 of train 28 also propagates through delay line 15, is inverted upon reflection by the shorted termination and appears as pulse 42 of output pulse train 44.

Pulse train 44 is simultaneously applied to rectifiers 37 and 39. Rectifier 37, forming the input circuit to the incoming velocity indicator channel, is poled to pass negative-going signals such as pulse 45 of train 44. Threshold circuit 38 at the output of rectifier 37 is designed to pass negative pulses which exceed the unit amplitude of pulses 29 and 42. Thus, only pulse 45 of train 44 appears at the output of threshold circuit 38.

In the case of an outgoing target, pulse train 32 is produced at the output of subtracting circuit 13. In this case, delay line 15 would produce pulse train 46. It should be noted that although negative-going pulses 33 and 48 of train 46 will be passed by rectifier 37 of the incoming target velocity indicating channel, indicator 17 is not actuated falsely. Pulses 33 and 48 are rejected by threshold circuit 38 and thus are prevented from influencing indicator 17. Solely pulse 45 (of incoming target pulse train 44) is both of proper polarity and sufficient amplitude to pass through circuit 38. Similarly, solely pulse 49 of outgoing target pulse train 46 appears at the output of threshold circuit 40. Pulse 45 unambiguously indicates the presence of an incoming target while pulse 49 similarly distinguishes an outgoing target.

Pulse 45 is of a predetermined amplitude independent of target velocity. Therefore, the D.C. component of pulse 45 is solely a function of its duration which, in turn, is proportional to target velocity. The D.C. component of pulse 45 at the output of threshold circuit 38 is extracted by low pass filter 16 for the actuation of incoming velocity indicator 17. The D.C. component of pulse 49 passed by threshold circuit 40, in the presence of an outgoing target, is extracted by low pass filter 18 for the activation of outgoing velocity indicator 19. Thus, indicator 19 exclusively displays the velocity of an outgoing target, whereas indicator 17 displays solely the velocity of an incoming target.

It will be noted from FIGS. 3A and 3B that although it is the leading edge of pulse 29 of pulse train 28 and the trailing edge of pulse 33 of pulse train 32 that represent target range in the respective instances of incoming and outgoing targets, both pulse edges have the same positive-going characteristic. Correspondingly, the leading edge of pulse 45 represents the range of an incoming target while the trailing edge of pulse 49 represents the range of an outgoing target. Again the leading edge of pulse 45 and the trailing edge of pulse 49 have the same slope sense, both being negative-going. This similarity of slope characteristic is exploited in summing circuit 41 and differentiator and clipper 21 which produce and pass only a pulse concurrent with the negative-going edges of either of pulses 45 or 49. In both cases, the pulses representing the negative-going edges occur at a time relative to the radar trigger which is solely a function of target range. These pulses are applied to the vertical deflection plates of indicator 22.

The time or range coordinate of the display of indicator 22 is synchronized with the radar pulse repetition rate triggers of line 23 which are delayed in fixed time delay 24 before actuating sweep circuit 25. Fixed delay 24 introduces a delay in the triggers of line 23 equaling the sum of the delays introduced in the echo signal pulses in fixed delay 8 and in additive delay line 15. Thus, there is no mutual time displacement between the pulses at the output of differentiator and clipper 21 with respect to the pulses at the output of delay 24 excepting that which is attributable to target range.

Although the preferred embodiment of FIG. 2 includes low pass filters 16 and 18 for the generation of target velocity data, it will be recognized that no such signal averaging devices are required by the present invention. That is, target velocity data may be extracted during a single radar pulse repetition interval by simply monitoring the time displacement between the leading edges of the pulses at the outputs of limiters 11 and 12. For example, standard digital techniques may be employed to gate the output of a standard clock pulse source into a pulse counter during the time interval between the leading edges of the pulses at the outputs of limiters 11 and 12. The number of pulses counted would be a direct measure of target velocity.

From the preceding, it can be seen that the objects of the present invention have been achieved in a preferred embodiment by the provision of radar receiving apparatus adapted to respond to frequency modulated pulsed carrier signals reflected from targets. Each target pulse is applied to first and second pulse delay means, one having a frequency sensitive delay characteristic and the other having a frequency insensitive delay characteristic. Range information is extracted from data contained in the output pulse of the frequency insensitive delay channel while target velocity information is derived by comparing the times of occurrence of the corresponding output pulses from each of the frequency sensitive and frequency insensitive receiver delay elements.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a radar system adapted for the transmission of frequency modulated pulsed carrier signals, target echo pulse receiving means comprising first and second pulse delay means, said first delay means having a frequency sensitive delay characteristic and said second delay means having a frequency insensitive delay characteristic, means connected to the outputs of said first and second delay means for producing a data pulse having a duration proportional to the time separation between corresponding ones of the pulses at the outputs of said first and second pulse delay means, means adapted to receive said data pulse and responsive to the duration of said data pulse for indicating target velocity, and means adapted to receive said data pulse and responsive to the occurrence of said data pulse within the corresponding radar repetition interval for indicating target range.

2. A radar system comprising means for the transmission of frequency modulated pulsed carrier signals, means for receiving said pulsed carrier signal reflected from targets lying within the radar beam, first and second pulse delay means, said first delay means having a frequency sensitive delay characteristic and said second delay means having a frequency insensitive delay characteristic, said first and second pulse delay means being coupled to the output of said receiving means, means coupled to the outputs of said first and second pulse delay means for producing a data pulse having a duration proportional to the time separation between corresponding ones of the pulses at the outputs of said first and second pulse delay means, means adapted to receive said data pulse and responsive to the duration of said data pulse for indicating target velocity, and means adapted to receive said data pulse and responsive to the occurrence of said data pulse within the corresponding radar repetition interval for indicating target range.

3. A radar system comprising means for the transmission of frequency modulated pulsed carrier signals, means for receiving said pulsed carrier signals reflected from targets lying within the radar beam, first and second pulse delay means, said first delay means having a frequency sensitive delay characteristic and said second delay means having a frequency insensitive delay characteristic, said first and second pulse delay means being coupled to the output of said receiving means, a pulse amplitude subtracting circuit coupled to the outputs of said first and second pulse delay means for producing pulses having a predetermined amplitude and a duration equal to the time separation between corresponding ones of the pulses at the outputs of said first and second pulse delay means, means responsive to the duration of said pulses for indicating target velocity, and means responsive to the occurrence of said pulses within the radar pulse repetition interval for indicating target range.

4. A radar system comprising means for the transmission of linearly frequency modulated pulsed carrier signals, means for receiving said pulsed carrier signals reflected from targets lying within the radar beam, first and second pulse delay means, said first delay means having a frequency sensitive delay characteristic and said second delay means having a frequency insensitive delay characteristic, said first and second pulse delay means being coupled to the output of said receiving means, individual pulse detecting means coupled to the output of respective ones of said first and second pulse delay means, a pulse amplitude subtracting circuit coupled to the outputs of said detecting means for producing pulses having a predetermined amplitude and a duration equal to the time separation between corresponding ones of the pulses at the output of said detecting means, means connected to the output of said subtracting circuit and responsive to the duration of said pulses for indicating target velocity, and means connected to the output of said subtracting circuit and responsive to the occurrence of said pulses for indicating target range.

5. Apparatus as defined in claim 4 wherein said first delay means comprises an overcompression filter.

6. Apparatus as defined in claim 5 wherein said means connected to the output of said subtracting circuit for indicating target velocity comprises a pulse delay line having a shorted termination, said pulse delay line having an electrical length determined by the duration of the pulses at the outputs of said first and second delay means, a rectifier connected to the output of said pulse delay line, a threshold circuit connected to the output of said rectifier, a low pass filter connected to the output of said threshold circuit, and means for indicating the magnitude of the signal appearing at the output of said low pass filter.

References Cited by the Examiner
UNITED STATES PATENTS
2,624,876    1/1953    Dicke _____ 343—17.1

CHESTER L. JUSTUS, *Primary Examiner.*

FREDERICK M. STRADER, *Examiner.*